United States Patent [19]

Meislitzer et al.

[11] Patent Number: 4,927,984
[45] Date of Patent: May 22, 1990

[54] PROTECTIVE HOUSING FOR CABLE JOINTS

[75] Inventors: Karl-Heinz Meislitzer, Löhne/Gohfeld; Heinz Sandmann, Uchte, both of Fed. Rep. of Germany

[73] Assignee: Rose Elektrotechnik GmbH & Co. KG, Porta Westfalica, Fed. Rep. of Germany

[21] Appl. No.: 256,303

[22] Filed: Oct. 11, 1988

[30] Foreign Application Priority Data

Oct. 14, 1987 [DE] Fed. Rep. of Germany ..... 37351710

[51] Int. Cl.$^5$ .......................................... H02G 15/113
[52] U.S. Cl. .................................. 174/92; 174/65 R; 174/77 R
[58] Field of Search ............... 174/65 R, 65 SS, 77 R, 174/92

[56] References Cited

U.S. PATENT DOCUMENTS

| | | | |
|---|---|---|---|
| 2,736,451 | 2/1956 | Fogg | 174/92 |
| 3,895,177 | 7/1975 | Muslin | 174/77 R X |
| 3,913,956 | 10/1975 | Eidelberg et al. | 174/77 R X |
| 4,262,167 | 4/1981 | Bossard et al. | 174/92 |

*Primary Examiner*—Morris H. Nimmo
*Attorney, Agent, or Firm*—Salter & Michaelson

[57] ABSTRACT

A spigot and socket housing consists of a lower section (9) and an upper section (11) with cable inlet apertures for the jointing and/or branching of e.g. telecommunications cables situated in the separation face. For gas-pressure-tight and water-pressure-tight closure of such housings, cable end assemblies consisting of specially-shaped cable sockets (5, 6, 7) are used in combination with a seal-on-seal system in the region of the cable sockets.

8 Claims, 1 Drawing Sheet

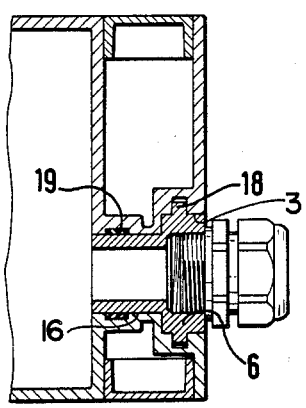
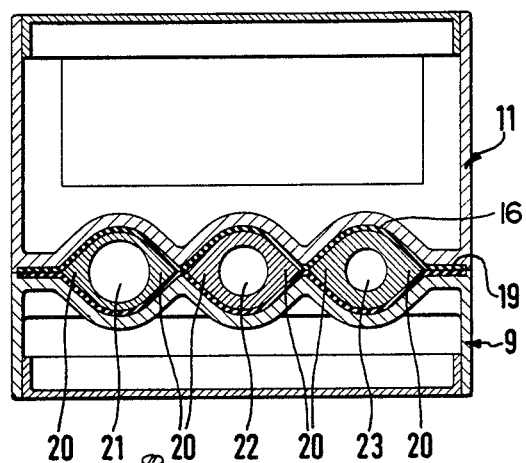
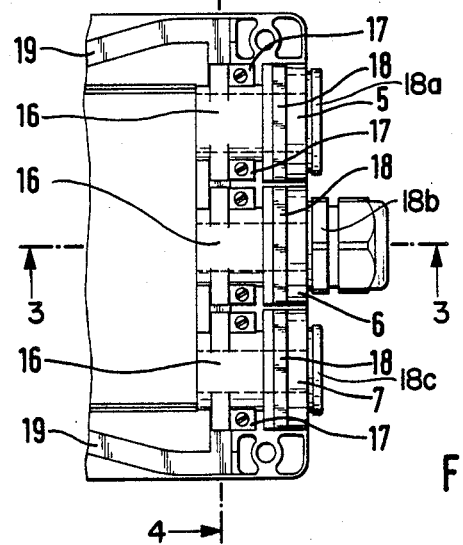
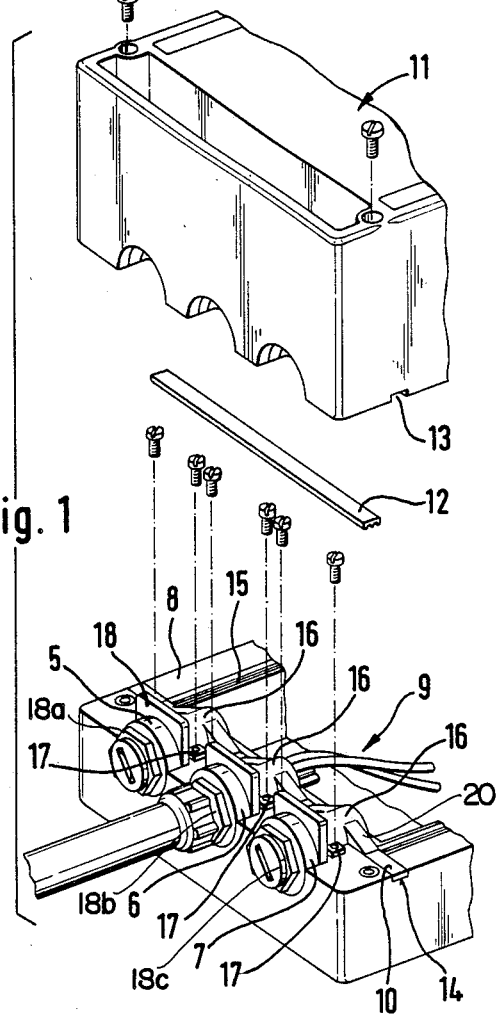

PROTECTIVE HOUSING FOR CABLE JOINTS

BACKGROUND OF THE INVENTION

The present invention relates to a protective housing.

A known protective housing consists of a lower section, with cable inlets set into recesses in the separation face between the lower section and the upper section. The upper section is sealed relative to the lower section and the cable inlets are sealed against water and air under pressure.

Such a protective housing may especially be in the form of a spigot and socket housing for the jointing and/or branching of telecommunications cables. With said housings the seal between the lower and upper sections is formed by means of a self-adhesive strip of bitumen or a bitumen sealing compound which is also wrapped around each cable to be fed into the housing and is then compressed within the separation face and the recessed cable inlets as the upper and lower sections are screwed together. To increase the effectiveness of the seal, the separation faces between the lower and the upper sections and the recesses for the cable inlets are also normally produced in the form of narrow parallel ridges so that the sealing strip or sealing compound is made to squeeze between the ridges.

Protective housings and/or spigot and socket connectors of this type are used for a wide variety of applications, including for example present state of the art uses in telecommunications, where they are used not only to protect the connections and/or branches of copper cables etc., but also for the jointing and branching of glass fibre cables.

In all applications, and especially where such housings and spigot and socket connectors are used in existing telecommunications networks, it is unavoidable that the housings need to be opened up and reclosed repeatedly, e.g. to carry out new cable connections or changes to the network. This opening and closing of known protective housings is very time consuming and always requires thorough cleaning operations in the region of the housing separation face and the cable inlets, since the bonded and compressed seals at these points need to be removed completely to ensure the desired gas pressure and water pressure tight seal when the housing is closed again.

An objective of the present invention is to improve protective housings of the above type in such a way that they can be reopened and reclosed without difficulty without in the process adversely affecting the specified protective classification of the housing.

SUMMARY OF THE INVENTION

Accordingly the present invention provides a protective housing for cable joints comprising:

upper and lower housing portions each having a respective jointing face for mating with that of the other portion;

a plurality of cable end assemblies set into recesses in the jointing faces;

a respective, substantially, non-adhesive sealing strip provided on each jointing face in the vicinity of said cable end assemblies for sealing said upper and lower housing portions and said cable end assemblies against water and gas;

wherein each said sealing strip is continuous and unjointed within the recesses for the cable end assemblies;

and said cable end assemblies include exchangeable cable sockets, and internal sealing means for sealing said sockets with respect to cables received therein, said sockets being located in said recesses and having on their outer circumferences respective sealing faces in contact with said sealing strips.

The combination of a seal-on-seal system fitted in the region of the cable end assemblies between the upper and lower portions and the exchangeable cable sockets inserted into the recesses in the housing as proposed by the invention, provides considerable practical advantages.

The cable sockets may be matched without difficulty to the diameters of the input or output cables concerned, which are often of diameters 13 mm, 16 mm or 21 mm. The cable sockets are typically used with a familiar internal sealing means, e.g. a stuffing box seal or a rubber compression seal, so that the cable concerned is sealed in a proven manner within the interior of the cable socket.

In a preferred form of the invention the cable sockets possess external sealing faces on their circumferences which match the corresponding recesses in the lower or the upper portions of the housing. If these external peripheral sealing faces are always the same with all the cable sockets to be used, regardless of the diameters of the internal cable openings in the cable sockets, then the cable sockets in the housings and spigot and socket connectors according to the invention may be exchanged subsequently without difficulty.

In one particular advantageous form, the housings according to the invention provide for the recesses and the external sealing faces of the cable sockets to be in the shape of eyes, with the corners of the eyes extending in a wedge shape when viewed in the direction of the cable inlet.

This provides seal transitions between on the one hand the normally straight jointing faces between the lower and upper portions of the housing and on the other hand the recesses for the cable sockets which can be executed in a particularly simple and easy manner even when particularly high sealing qualities are required of the housing with respect to pressurised water or gas. This is because these seal transitions avoid any sharp or abrupt changes in the course of the sealing system such as normally form the problem areas.

One version of the invention which is particularly appropriate is one in which the cable sockets each possess in the immediate proximity of their external sealing faces flange-type extensions for screw location of the cable sockets either to the lower portion of the housing or to the upper portion of the housing.

This ensures that the cable or, as applicable, the cable sockets remain attached to the lower portion of the housing or to the upper portion of the housing when the housing is opened, so that, for example, when only one cable needs to be exchanged the other cables remain fixed in position and the operation is not hindered.

In one appropriate version of the invention, the base section of the non-adhesive sealing strips provided between the lower portion of the housing and the upper portion of the housing and between the housing recesses and the cable sockets is inserted into a groove formed in the jointing faces and the recesses. The strips may consist of normal commercial materials. It can also be of advantage to foam these sealing strips directly into the above grooves, e.g. as a silicon seal.

BRIEF DESCRIPTION OF THE DRAWINGS

One example of a version of the invention will now be described in greater detail with reference to the drawings, of which:

FIG. 1 is an exploded view of a part of a housing according to the invention;

FIG. 2 is a plan view of an open lower section of the housing;

FIG. 3 is a section through the housing shown in FIG. 2 along line III—III in FIG. 2, and FIG. 4 is a section through the housing shown in FIG. 2 along line IV—IV in FIG. 2.

DETAILED DESCRIPTION

The drawing in FIG. 1 shows the end zone of a housing according to the invention such as may be used, e.g. as a spigot and socket housing for the jointing and/or branching of telecommunications cables.

Recesses in the separation faces of the housing sections cooperate to define cable accepting inlet apertures 3 and cable sockets 5, 6 and 7 are received in the inlet apertures 3. In the region of these cable sockets, a jointing or separation face 8 of a lower portion 9 of the housing is provided with a sealing strip 10 which also passes across the recesses for the cable sockets 5, 6 and 7 in an unbroken and seamless form.

In a similar manner, an upper portion 11 of the housing as illustrated is also equipped with a sealing strip 12. The sealing strips 11 and 12 are laid in grooves 13 and 14 in the upper and lower portions of housing, respectively.

The longitudinal sides of the housing shown in FIG. 1 are also sealed relative to each other by means of a sealing strip 15. In this area of the longitudinal sides of the housing, however, it would be sufficient if only either the lower portion of the housing or the upper portion of the housing were to possess such a sealing strip. A seal-on-seal system is not absolutely essential at this point, as is the case in the area of the cable sockets 5, 6 and 7.

The cable sockets each possesses an external sealing face 16 on their circumference which, when viewed in the direction of the cable inlet is in the shape of an eye with the corners of the eye extending in a wedge shape, as can be seen more clearly in FIG. 4. Immediately adjacent to these outer sealing faces 16, each cable socket possesses flange-type extensions 17 for screw-location of the cable sockets to the lower portion 9 of the housing.

Each of the illustrated cable sockets is also inserted into the lower portion 9 of the housing and the upper portion 11 of the housing together with a rectangular plate 18 which acts both as a crude initial seal and especially as an anti-twist lock during tightening of cover nuts or blanking plugs on the cable sockets. Conventional cable glands or cable sealing grips 18a, 18b and 18c are received in threaded engagement in the sockets 5, 6 and 7, respectively, for sealing between the sockets 5, 6 and 7 and respective cables received therein.

FIGS. 2, 3 and 4 show design details of a housing according to the invention. In contrast with the housing in FIG. 1, however, a seal-on-seal system is also shown on the longitudinal sides of the housing, as can be seen in FIG. 2 with its peripheral sealing strip 19 which, as an example, is here foamed direct into the corresponding groove in the separation face of the lower portion of the housing. This sealing strip too passes through the recesses for the cable sockets in an unbroken and seamless form.

With this exception, the same reference numbers are used in FIGS. 2, 3 and 4 as those shown in FIG. 1 for the same component parts, and there is therefore no need for repeating the description.

It is, however, important to note that FIG. 4 shows very clearly the particularly advantageous version of the invention in which the recesses in the lower portion 9 of the housing and the upper portion 11 of the housing and the outer sealing face 16 of the cable sockets 5, 6 and 7, when viewed in the direction of the cable inlets, are in the shape of eyes with the corners of the eyes 20 extending in a wedge shape.

It can also be seen that each of the cable sockets illustrated in FIG. 4 possesses a different internal diameter for each internal inlet opening 21, 22, 23 for receiving different diameters of cable without the external contours and dimensions of the cable sockets being changed, with the result that these may be interchanged at will.

We claim:

1. A housing assembly for a cable splicing joint in a cable system comprising upper and lower housing sections having upper and lower separation faces thereon, said upper and lower housing sections being joined along said upper and lower separation faces, said upper and lower separation faces including upper and lower front separation face portions having upper and lower recesses therein, respectively, which cooperate to define a cable accepting inlet aperture, a cable socket removably received in said cable accepting inlet aperture, said cable socket having an internal inlet opening therein, internal seal means in said internal inlet opening for sealing between said socket and a cable received in said internal inlet opening, said socket having an outer circumferential sealing face thereon, and non-adhesive sealing strip means for sealing between said upper and lower separation faces and between said upper and lower recesses and said sealing face, said sealing strip means including upper and lower seamless, unbroken non-adhesive sealing strips which extend along the entire extents of said upper and lower front separation face portions, respectively, and the upper and lower recesses therein, respectively, for sealing between said upper and lower front separation face portions and between said recesses and said sealing face.

2. A housing according to claim 3, wherein said sealing strips are laid in respective grooves formed in the jointing faces and recesses.

3. In the housing assembly of claim 1, said sealing face having an eye-shaped transverse cross-sectional peripheral configuration.

4. In the housing assembly of claim 3, said socket including apertured flange extensions and being secured in said lower housing section with screws which pass through the apertures in said flange extensions, said flange extensions being disposed adjacent said sealing face and being positioned so as to avoid interference with said sealing strips by said flange extensions and/or said screws.

5. A housing according to claim 4, wherein said sealing strips are laid in respective grooves formed in the jointing faces and recesses.

6. In the housing assembly of claim 1, said socket including apertured flange extensions and being secured in said lower housing section with screws which pass through the apertures in said flange extensions, said flange extensions being disposed adjacent said sealing face and being positioned so as to avoid interference with said sealing strips by said flange extensions and/or said screws.

7. A housing according to claim 6, wherein said sealing strips are laid in respective grooves formed in the jointing faces and recesses.

8. A housing according to claim 1, wherein said sealing strips are laid in respective grooves formed in the jointing faces and recesses.

* * * * *